US008171176B2

(12) United States Patent
Battacharya et al.

(10) Patent No.: US 8,171,176 B2
(45) Date of Patent: May 1, 2012

(54) METHOD FOR SELECTIVE REPLICATION OF PHYSICAL DEVICES ON A VIRTUAL SELF-CONFIGURING ZONING EXPANDER

(75) Inventors: Sayantan Battacharya, Colorado Springs, CO (US); Lawrence J. Rawe, Colorado Springs, CO (US); Edoardo Daelli, Castle Rock, CO (US)

(73) Assignee: LSI Corporation, Milpitas, CA (US)

( * ) Notice: Subject to any disclaimer, the term of this patent is extended or adjusted under 35 U.S.C. 154(b) by 57 days.

(21) Appl. No.: 12/873,110

(22) Filed: Aug. 31, 2010

(65) Prior Publication Data
US 2012/0054396 A1 Mar. 1, 2012

(51) Int. Cl.
*G06F 13/00* (2006.01)
*G06F 13/12* (2006.01)
*G06F 12/00* (2006.01)
*G06F 12/08* (2006.01)
*G06F 3/00* (2006.01)
*G06F 3/06* (2006.01)

(52) U.S. Cl. ........... 710/2; 710/3; 710/8; 710/9; 710/37; 710/38; 710/62; 710/63; 710/64; 710/72; 710/73; 710/74; 710/104; 710/300; 711/1; 711/2; 711/6; 711/100; 711/111; 711/112; 711/114; 711/200; 711/202; 718/1

(58) Field of Classification Search .................. 710/2–3, 710/8–9, 37–38, 62–64, 72–74, 104, 300; 711/1, 2, 6, 100, 111, 112, 114, 200, 202; 718/1
See application file for complete search history.

(56) References Cited

U.S. PATENT DOCUMENTS

| 7,028,106 | B2 | 4/2006 | Foster et al. | |
|---|---|---|---|---|
| 7,299,468 | B2 * | 11/2007 | Casey et al. | 718/104 |
| 7,668,925 | B1 | 2/2010 | Liao et al. | |
| 7,774,446 | B2 * | 8/2010 | Nedelcu et al. | 709/223 |
| 7,870,301 | B2 * | 1/2011 | Arndt et al. | 710/8 |
| 2006/0101171 | A1 * | 5/2006 | Grieff et al. | 710/36 |
| 2007/0165660 | A1 * | 7/2007 | Fang et al. | 370/410 |
| 2009/0150643 | A1 * | 6/2009 | Jones et al. | 711/203 |
| 2010/0223448 | A1 * | 9/2010 | Farrell et al. | 712/225 |

* cited by examiner

*Primary Examiner* — Tanh Nguyen
(74) *Attorney, Agent, or Firm* — Christopher P. Whitman; Cochran Freund & Young LLC (57) ABSTRACT

Disclosed is a method and a SAS controller device that abstract access from one or more virtual machines operating on a host system to SAS physical devices connected to the SAS controller without a routing table for port-to-port messaging on the SAS controller. An embodiment may create a virtual expander for each physical port of the SAS controller and further create virtual ports within the virtual expanders to provide abstracted access to SAS physical devices for the virtual machines. The SAS physical devices may be replicated/cloned within the virtual ports. Each replicated/cloned SAS physical device may be assigned a unique SAS address for the SAS controller (i.e., unique for the SAS controller such that other replicates/clones on other virtual ports have a different SAS address). If a physical expander that supports zoning is connected to a SAS controller port, an embodiment may further selectively replicate/clone the SAS physical devices for a virtual port based on whether or not a SAS physical device is included in a zoning group associated with the virtual port. An embodiment may further abstract access to SAS physical devices through a virtual function that permits access to one virtual port per virtual expander in order to permit access for the virtual machine associated with the virtual function to more than one physical port of the SAS controller.

20 Claims, 9 Drawing Sheets

METHOD FOR SELECTIVE REPLICATION OF PHYSICAL DEVICES ON A VIRTUAL SELF-CONFIGURING ZONING EXPANDER

BACKGROUND OF THE INVENTION

A typical computer system includes some form of computer readable storage media to store data and programs, such as hard disk drives, solid state drives, optical drives, tape drives, Redundant Array of Independent Disks (RAID) devices, etc. Communications protocols for communications between computer systems and the computer readable storage media have been created and agreed upon so that a computer from one manufacturer is capable of reading and/or writing a computer readable storage media device from another manufacturer if the computer and the computer readable storage media device comply with the applicable communications protocols. One early high speed protocol for communications between a computer and a computer readable storage media device was the parallel bus based Small Computer System Interface (SCSI). A current protocol that replaces the original parallel bus based SCSI protocol is the serial based Serial Attached SCSI (SAS) protocol. While SAS is based on a serial bus and the original SCSI protocol is based on a parallel bus, the SAS protocol does retain compatibility with much of the standard SCSI command set, which helps to maintain software compatibility even though there may be significant hardware changes in the communication pathway.

One advancement for computer systems implementing SAS compatible device architectures was the addition of SAS expander physical devices. An SAS expander permits the creation of more complex interconnect topologies. An SAS expander expands the capabilities of a typical SAS controller and permits a larger number of target devices to be connected and accessed by a computer system than would be possible connecting the end devices directly to the physical ports of the SAS controller incorporated in the computer system. Two types of expander devices are currently defined in the SAS protocol, an "edge expander" and a "fanout expander." An edge expander allows the SAS controller to communicate with additional target devices and may incorporate direct port routing and/or subtractive routing. A fanout expander may be used to connect sets of edge expanders, greatly increasing the number of potential devices that may be included in a system architecture. However, a typical fanout expander does not support subtractive routing.

Another advancement for computer systems implementing SAS compatible device architectures is the incorporation of SAS zoning into the SAS protocol. SAS zoning provides for an ability to segregate and manage physical device traffic on the SAS buses interconnecting the physical devices. The access control functionality of SAS zoning is implemented on the SAS expanders. Using SAS zoning, SAS initiators and targets may not see the entire SAS architecture (i.e., domain), but, instead, the initiators and targets may only see the portions of the SAS architecture configured to be in the zoning group that the initiators and targets have been given permission to access. In other words, by configuring zoning groups, devices may be effectively limited to access to and from other devices in the same zoning group. Accordingly, access control from SAS zoning may provide traffic segregation between hosts and resources, assist in a flexible redeployment of resources, control sharing of resources, limit/restrict types of resource access, limit the impact of topology changes in physical device architectures, and/or prevent unauthorized access from a malicious attack or due to operator error.

SUMMARY OF THE INVENTION

An embodiment of the present invention may comprise a method for at least one virtual machine operating on a computer system, in addition to a master/hypervisor application operating on the computer system, to access at least one Serial Attached SCSI (Small Computer System Interface) (SAS) physical device connected to the computer system via at least one physical port of a SAS controller of the computer system without using a routing table on the SAS controller comprising: creating a virtual expander operating on the SAS controller for the at least one physical port of the SAS controller, the virtual expander not having a routing table for port-to-port routing of messages; creating a static root virtual port operating within the virtual expander on the SAS controller to abstract access to the at least one SAS physical device connected via the at least one physical port of the SAS controller; creating a virtual port operating within the virtual expander on the SAS controller that operates in coordination with the at least one virtual machine; creating a complete local topology copy within the virtual expander operating on the SAS controller that replicates a physical topology of physical devices connected and visible to the at least one physical port of the SAS controller, the complete local topology copy including the at least one SAS physical device; creating a private clone copy of the at least one SAS physical device within the virtual port operating within the virtual expander based on the complete local topology copy within the virtual expander such that the at least one SAS physical device is replicated within the virtual port; assigning a unique SAS address to the private clone copy of the at least one SAS physical device; registering the private clone copy assigned the unique SAS address with the at least one virtual machine corresponding to the virtual port such that a one-to-one association is established between the virtual port and the static root virtual port within the virtual expander operating on the SAS controller; and accessing the at least one SAS physical device by the at least one virtual machine through the private clone copy of the at least one SAS physical device replicated on the corresponding virtual port using the unique SAS address.

The embodiment of the method in the previous paragraph wherein the physical topology connected and visible to the at least one physical port of the SAS controller includes at least one physical expander and the at least one physical expander supports zoning; wherein the physical topology includes a plurality of SAS physical devices; wherein the plurality of SAS physical devices are configured for inclusion in a plurality of zoning groups such that each zoning group of the plurality of zoning groups includes at least a subset of the plurality of SAS physical devices; wherein the virtual port corresponding to the at least one virtual machine is associated with a zoning group and the zoning group is one of the plurality of zoning groups; and wherein the step of creating the private clone copy of the at least one physical device within the virtual port further comprises first determining whether the at least one SAS physical device is included in the zoning group and selectively creating the private clone copy of the at least one physical device when the at least one SAS physical device is included in the zoning group such that when the at least one SAS physical device is not included in the zoning group the private clone copy of the at least one SAS physical device is not created within the virtual port.

An embodiment of the present invention may further comprise a SAS controller incorporated into a computer system that interacts with at least one virtual machine operating on the computer system, in addition to a master/hypervisor application operating on the computer system, that accesses at least one SAS physical device connected to the computer system via at least one physical port of the SAS controller of the computer system without using a routing table on the SAS controller comprising: a virtual expander creation subsystem that creates a virtual expander that operates on the SAS controller and is associated with the at least one physical port of the SAS controller, the virtual expander not having a routing table for port-to-port routing of messages; a static root virtual port creation subsystem that creates a static root virtual port that operates within the virtual expander on the SAS controller and that abstracts access to the at least one SAS physical device connected via the at least one physical port of the SAS controller; a virtual port creation subsystem that creates a virtual port that operates within the virtual expander on the SAS controller and that operates in coordination with the at least one virtual machine; a topology replication subsystem that creates a complete local topology copy within the virtual expander operating on the SAS controller to replicate a physical topology of physical devices connected and visible to the at least one physical port of the SAS controller, the complete local topology copy including the at least one SAS physical device; a private clone copy creation subsystem that creates a private clone copy of the at least one SAS physical device within the virtual port operating within the virtual expander based on the complete local topology copy within the virtual expander such that the at least one SAS physical device is replicated within the virtual port; an SAS address assignment subsystem that assigns a unique SAS address to the private clone copy of the at least one SAS physical device; a registration subsystem that registers the private clone copy assigned the unique SAS address with the at least one virtual machine corresponding to the virtual port such that a one-to-one association is established between the virtual port and the static root virtual port within the virtual expander operating on the SAS controller, and such that the at least one SAS physical device is accessed by the at least one virtual machine through the private clone copy of the at least one SAS physical device replicated on the corresponding virtual port using the unique SAS address.

The embodiment of the SAS controller in the previous paragraph wherein the physical topology connected and visible to the at least one physical port of the SAS controller includes at least one physical expander and the at least one physical expander supports zoning; wherein the physical topology includes a plurality of SAS physical devices; wherein the plurality of SAS physical devices are configured for inclusion in a plurality of zoning groups such that each zoning group of the plurality of zoning groups includes at least a subset of the plurality of SAS physical devices; wherein the virtual port corresponding to the at least one virtual machine is associated with a zoning group and the zoning group is one of the plurality of zoning groups; and wherein the private clone copy creation subsystem first determines whether the at least one SAS physical device is included in the zoning group and selectively creates the private clone copy of the at least one physical device when the at least one SAS physical device is included in the zoning group such that when the at least one SAS physical device is not included in the zoning group the private clone copy of the at least one SAS physical device is not created within the virtual port.

An embodiment of the present invention may further comprise a Serial Attached SCSI (Small Computer System Interface) (SAS) controller incorporated into a computer system that interacts with at least one virtual machine operating on the computer system, in addition to a master/hypervisor application operating on the computer system, that accesses at least one SAS physical device connected to the computer system via at least one physical port of the SAS controller of the computer system without using a routing table on the SAS controller comprising: means for creating a virtual expander operating on the SAS controller for the at least one physical port of the SAS controller, the virtual expander not having a routing table for port-to-port routing of messages; means for creating a static root virtual port operating within the virtual expander on the SAS controller to abstract access to the at least one SAS physical device connected via the at least one physical port of the SAS controller; means for creating a virtual port operating within the virtual expander on the SAS controller that operates in coordination with the at least one virtual machine; means for creating a complete local topology copy within the virtual expander operating on the SAS controller that replicates a physical topology of physical devices connected and visible to the at least one physical port of the SAS controller, the complete local topology copy including the at least one SAS physical device; means for creating a private clone copy of the at least one SAS physical device within the virtual port operating within the virtual expander based on the complete local topology copy within the virtual expander such that the at least one SAS physical device is replicated within the virtual port; means for assigning a unique SAS address to the private clone copy of the at least one SAS physical device; means for registering the private clone copy assigned the unique SAS address with the at least one virtual machine corresponding to the virtual port such that a one-to-one association is established between the virtual port and the static root virtual port within the virtual expander operating on the SAS controller; and means for accessing the at least one SAS physical device by the at least one virtual machine through the private clone copy of the at least one SAS physical device replicated on the corresponding virtual port using the unique SAS address.

The embodiment of the SAS controller in the previous paragraph wherein the physical topology connected and visible to the at least one physical port of the SAS controller includes at least one physical expander and the at least one physical expander supports zoning; wherein the physical topology includes a plurality of SAS physical devices; wherein the plurality of SAS physical devices are configured for inclusion in a plurality of zoning groups such that each zoning group of the plurality of zoning groups includes at least a subset of the plurality of SAS physical devices; wherein the virtual port corresponding to the at least one virtual machine is associated with a zoning group and the zoning group is one of the plurality of zoning groups; and wherein the means for creating the private clone copy of the at least one physical device within the virtual port further comprises means for first determining whether the at least one SAS physical device is included in the zoning group and selectively creating the private clone copy of the at least one physical device when the at least one SAS physical device is included in the zoning group such that when the at least one SAS physical device is not included in the zoning group the private clone copy of the at least one SAS physical device is not created within the virtual port.

DETAILED DESCRIPTION OF THE EMBODIMENTS

To assist the reader, below is a list and definition of acronyms that may be used herein.

| | |
|---|---|
| IOC: | Input/Output Controller |
| HBA: | Host Bus Adapter |
| MPI: | Message Passing Interface |
| PF: | Physical Function |
| PFVP: | Physical Function Virtual Port |
| RAID: | Redundant Array of Independent Disks |
| SAS: | Serial Attached SCSI |
| SCSI: | Small Computer System Interface |
| SPV: | SAS Port Virtualization |
| SRVP: | Static Root Virtual Port |
| VE: | Virtual Expander |
| VM: | Virtual Machine |
| VF: | Virtual Function |
| ZPT: | Zone Permission Table |

Figure 1A:
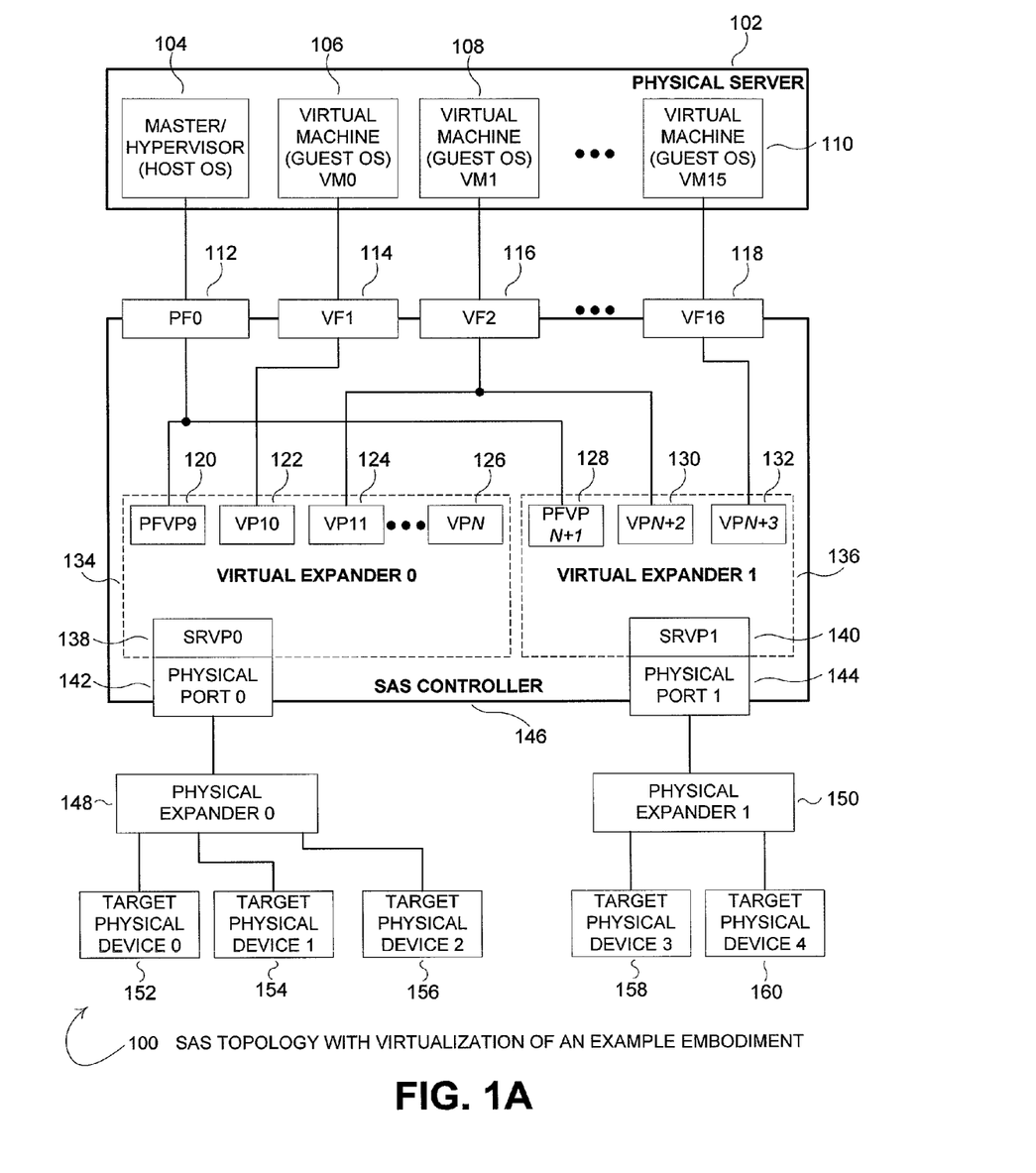
FIG. 1A is a schematic illustration of an example embodiment of a Serial Attached SCSI (Small Computer System Interface) (SAS) topology with virtualization.
Figure 1B:
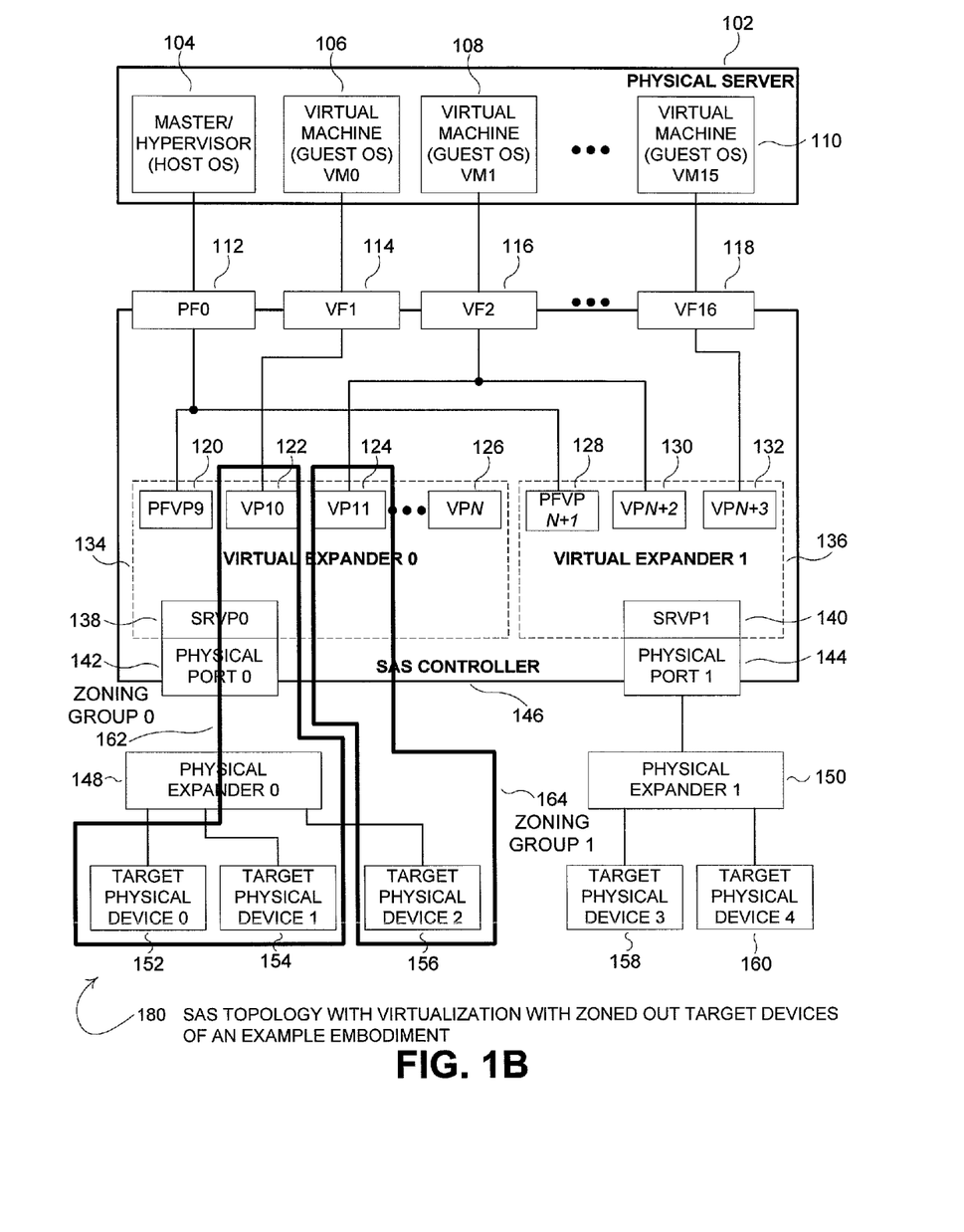
FIG. 1B is a schematic illustration of the example embodiment of a SAS topology with virtualization of FIG. 1A, additionally showing zoned out target devices.

FIG. 1A is a schematic illustration 100 of an example embodiment of a Serial Attached SCSI (Small Computer System Interface) (SAS) topology with virtualization. SAS Port Virtualization (SP V) is a method to abstract a physical port 142, 144 of a SAS controller 146 for use by one or more virtual machines 106-110. As a general matter, when speaking of "virtual" devices, it is understood that the "virtual" device is a software, or programmatic, implementation of a physical device. Further, a "virtual" device operating within a physical device or within another "virtual" device may be considered to be a subsystem of the physical or other "virtual" device the "virtual" device is operating within. A Virtual Machine (VM) 106-110 is a software implementation of a computer system that executes applications as though the virtual machine 106-110 were a separate, isolated copy of a physical computer system 102. Virtual machines 106-110 permit sharing of underlying physical machine 102 resources between different virtual machines 106-110, with a separate and distinct operating system running on each virtual machine 106-110. The software layer that provides the virtualization for the one or more virtual machines 106-110 is typically called the master, virtual machine monitor, or hypervisor 104. The master/hypervisor 104 may run directly on the hardware of the physical machine (i.e., physical server) 102, or the master/hypervisor 104 may run on top of a host operating system, as is depicted in the embodiment illustrated in FIGS. 1A & B.

A typical embodiment may be physically comprised of a physical machine/server 102 having an associated SAS controller 146, where the SAS controller 146 has one or more physical ports 142, 144 that are each connected to a topology of SAS devices 148-160. The master/hypervisor 104 and the virtual machines 106-110 operate on the physical server 102 and connect to the SAS physical devices 148-160 via the SAS controller 146. For SAS port virtualization, there may be a Virtual Expander (VE) 134, 136 operating on the SAS controller 146. There may be one virtual expander 134, 136 associated with each physical port 142, 144 of the SAS controller 146. Each physical port 142, 144 of the SAS controller 146 may be abstracted to a Static Root Virtual Port (SRVP) 138, 140 operating within the virtual expander 142, 144 associated with the physical port 142, 144 the SRVP 138, 140 is abstracting. Each virtual expander may also have one or more Virtual Ports (VPs) 120-132 operating within the virtual expander 134, 136. Each virtual port 120-132 may then be connected to a virtual machine 106-110 or to the master/host 104. When the virtual port 120, 128 is connected to the master/host 104, it may be referred to as a Physical Function Virtual Port (PFVP) 120, 128. Due to resource constraints on the SAS controller 146, it may be impractical or may not even be possible for virtual expanders 134, 136 to implement a routing table (aka. virtual routing table) for port-to-port routing between the Virtual Ports (VPs) 120-132 and the SRVPs 138, 140. To address the issue of a lack of routing tables on the virtual expanders 134, 136, an embodiment may create/replicate a copy/clone of the SAS physical devices 148-160 accessible by the virtual expander 134, 136 within which the virtual ports 120-132 are operating. For a virtual machine 106-110 or the master/hypervisor 104 to access a virtual port 120-132 in each of multiple virtual expanders 134, 136, an embodiment may further abstract the virtual ports 120-132 with virtual functions 112-118 operating on the SAS controller 146. When the virtual function 112 is connected to the master/host 104, it may be referred to as a Physical Function 112. The virtual function 112-118 abstraction permits a virtual machine 106-110 or the master/hypervisor 104 to access one virtual port 120-132 in each virtual expander 134, 136 such that the virtual machine 106-119 or the master/hypervisor 104 may access SAS physical devices 148-160 connected via any of the physical ports 142, 144 of the SAS controller 146.

The embodiment illustrated 100 in FIG. 1A represents a typical SAS architecture implementation that supports SAS port virtualization. There is a physical server 102 having a SAS controller 146 with two physical ports 142, 144, that connect to topologies of SAS devices 148-160, including two physical expanders 148, 150. More particularly, physical port zero (142) is connected to physical expander zero (148) and physical port one (144) is connected to physical expander one (150). Physical expander zero (148) connects to three target physical devices 152-156 and physical expander one (150) connects to two target physical devices 158, 160. Hence, the complete topology connected and visible to physical port zero (142) is comprised of physical expander zero (148), target physical device zero (152), target physical device one (154) and target physical device two (156), with physical expander zero (148) connected between the target physical devices 152-156 and physical port zero (142). The complete topology connected and visible to physical port one (144) is comprised of physical expander one (150), target physical device three (158), and target physical device four (160), with physical expander one (150) connected between the target physical devices 158, 160 and physical port one (144). SAS physical devices 152-160 may be any SAS compatible device such as, but not limited to: a Redundant Array of Independent Disks (RAID), a hard disk drive, a solid state drive, an optical drive, a tape drive, a computer readable storage device, and a SAS expander. For ease of implementation, it may be beneficial for an embodiment to use self-configuring expanders for physical expander zero (148) and one (150).

To implement the SAS port virtualization, one virtual expander 138, 140 may be created on the SAS controller 146 for each physical port 142, 144 of the SAS controller 146. Within each virtual expander 138, 140 a SRVP 138, 140 may be created in order to abstract the physical port 142, 144 associated with the virtual expander. As with the physical expanders 148, 150, it may be beneficial for an embodiment to implement the virtual expanders 134, 136 as self-configuring virtual expanders 148, 150. For the embodiment illustrated in FIG. 1A, virtual expander zero (134) is created on the SAS controller 146 and is associated with physical port zero (142) such that SRVP0 (138) is created within virtual expander zero (134). Virtual expander one (136) is created on the SAS controller 146 and is associated with physical port one (144) such that SRVP1 (140) is created within virtual expander one (136). A complete local copy of the topology of SAS devices 148-160 connected and visible to the physical ports 142, 144 of the SAS controller 146 may be created within each virtual expander 138, 140. For the embodiment illustrated in FIG. 1A, virtual expander zero (134) would have a complete local copy of physical expander zero (148), target physical device zero (152), target physical device one (154), and target physical device two (156). Virtual expander one (136) would have a complete local copy of physical expander one (150), target physical device three (158), and target physical device four (160).

The SAS port virtualization implementation may create one or more virtual ports 120-132 within the domain of the virtual expanders 134, 136. For the embodiment illustrated in FIG. 1A, PFVP9 (120) and VPs ten (122) to N(126) are created within virtual expander zero (134). PFVPN+1 (128) and VPs N+2 (130) and N+3 (132) are created within virtual expander one (136). Each of the virtual ports 120-132 serve as a portal for a virtual machine 106-110, or the master/hypervisor 104, to communicate with the SRVP 138, 140 and the physical topology 148-160 abstracted through the SRVP 138, 140 within the same virtual expander 134, 136 as the virtual port 120-132 being used for communication. As described above, the virtual expanders 134, 136 lack a true routing table, so, unlike a physical expander 148, 150, the virtual expanders 134, 136 cannot perform port-to-port routing of messages and inputs/outputs between the SRVP 138, 140 and the virtual ports 120-132. To address the problem of a lack of routing tables on the virtual expanders 134, 136, each virtual port 120-132 may create a clone (i.e., a copy) of the SAS physical devices 148-160 connected to physical port 142, 144 associated with the virtual expander 134, 136 within which each virtual port 120-132 operates. To ensure that a routing table is not needed, each clone of a SAS physical device 148-160 created within the virtual ports 120-132 operating on the SAS controller is assigned a unique SAS address within the SAS controller such that no two cloned SAS physical devices created within the virtual ports 120-136 has a duplicate SAS address. Thus, the many-to-one associations between the virtual ports 120-132, the associated virtual expander 134, 136, and the associated SRVPs 138, 140 are now effectively reduced to many one-to-one associations by the replication mechanism and the assignment of unique SAS addresses for the cloned SAS physical devices. The one-to-one associations also provide the advantage of a direct mapping between the SAS physical devices 148-160 and the virtual port 120-132. Consequently, a routing table for port-to-port messaging on the virtual expanders 134, 136 is not necessary.

In the embodiment illustrated in FIG. 1A, the virtual ports 120-132 are further abstracted by Virtual Functions (VFs) 112-118 before being connected to the master/hypervisor 104 and virtual machines 106-110 operating on the physical server 102. Each virtual function 112-118 is connected to one virtual machine 106-110 or to the master/hypervisor 104. For the embodiment illustrated in FIG. 1A, physical function zero (PFO) (112) is connected to the master/hypervisor 104 and provides access to Physical Function Virtual Port nine (PFVP9) within virtual expander zero (134) and to PFVPN+1 (128) within virtual expander one (136). Virtual function one (VF1) (114) is connected to virtual machine zero (VM0) (106) and provides access to Virtual Port ten (VP10) within virtual expander zero (134). VF2 (116) is connected to VM1 (108) and provides access to VP11 within virtual expander zero (134) and to VPN+2 (130) within virtual expander one (136). VF16 (118) is connected to VM15 (110) and provides access to PN+3 (132) within virtual expander one (136). For brevity, VMs two through fourteen and corresponding VFs three through fifteen are not shown in FIG. 1A, but may be connected as desired to one virtual port 120-132 within each virtual expander 134, 136. Further, the number of virtual machines 106-110 and the corresponding number of virtual functions 112-118 is a function of the desires of a system implementer and the resources available on the physical server 102 and the SAS controller 146. Without the resource constraints of the physical server 102 and/or the SAS controller 146, the number of virtual machines 106-110 and corresponding virtual functions 112-118 is logically unlimited. While the virtual functions 112-118 may be used to abstract access to a single virtual port 120-132. See, for example, VF1 (114) and VF16 (118), the virtual function 112-118 abstraction allows a virtual machine 106-110 or the master/hypervisor 104 to connect to multiple virtual ports 120-132, one per available virtual expander 134 136. See, for example, PFO (112) and VF2 (116). By ensuring that only one virtual port 112-118 per virtual expander 134, 136 is connected to any one virtual function 112-118, the abstraction of the physical port 142, 144 within by the associated virtual expander 134, 136 may be responsible for the processing and routing of the messages and inputs/outputs of the virtual machine 106-110 or the master/hypervisor 104 connected to the virtual function 112-118.

FIG. 1B is a schematic illustration 180 of the example embodiment of a SAS topology with virtualization of FIG. 1A, additionally showing zoned out 162, 164 target devices 152-160. The basic operation of the embodiment illustrated in FIG. 1B operates as disclosed with respect to FIG. 1A, except as described below. In order for SAS zoning to be supported, at least one of the physical expanders 148, 150 must support SAS zoning. In order to zone out or zone in target physical devices 152-160, the zoning permissions must be configured such that some, or all, or the target physical devices 152-160 are included in one more zoning groups. Each zoning group may include a subset, up to all, of the target physical devices 152-160 accessible to a physical zoning expander 148, 150. For example, as illustrated in FIG. 1B, target physical device zero (152) and target physical device one (154) are configured to be included in zoning group zero (162) while target physical device two (156) is configured to be in zoning group one (164). By associating a zoning group 162, 164 with a virtual port 120-132, an embodiment may use the Zoning Permission Table (ZPT) to selectively replicate/copy clones of the target physical devices 152-160 for each virtual port 120-132. As a result, each virtual machine 106-110 may limit access to only target physical devices 152-160 authorized by a system implementer. Selective replication also has the benefit of reducing the resources necessary to replicate/clone target physical devices 152-160 on the SAS controller to the target physical devices 152-160 actually accessed by each virtual machine 106-110 as well as reducing the message traffic required to maintain and handle connections with target physical devices 152-160 that are not accessed by a particular virtual machine 106-110. Note that parent SAS physical devices, such as physical expanders 148, 150, are automatically included in a zoning group for a target physical device 152-160, and will have a clone created within a virtual port 120-132 as necessary to replicate the path to access the target physical device 152-160. For the embodiment illustrated in FIG. 1B, with selective replication, VF1 (114) is allowed to communicate with target physical device zero (152) and target physical device one (154), but not target physical device two (156), based on the configured zoning groups 162, 164 and the zone permissions allocated to VP10 (122) within virtual expander zero (134). VF2 (116), also under selective replication, is allowed to communicate with target physical device two (156), but not target physical devices zero (152) and one (154), based on the configured zoning groups 162, 164 and the zone permissions allocated to VP11 (124) within virtual expander zero (134). Since VF2 (116) is also connected to VPN+2 (130) in virtual expander one (136), and zoning is not configured for physical expander one (150), VF2 (116) would replicate clones for, and have access to, all target physical devices 158, 160, connected to physical port one (144) through physical expander one (150).

For the embodiment illustrated in FIG. 1B, it may be beneficial for the master/hypervisor 104 to have access to the complete topology of physical devices 148-160 by replicating the complete local topology created in each virtual expander 134, 136 within the PFVPs 120, 128 connected to the master/hypervisor 104. It may be further beneficial for the clones of the SAS physical devices 148-160 in the PFVPs 120, 128 connected to the master/hypervisor 104 to use the actual SAS address of the SAS physical devices 148-160 and have the clones of the SAS physical devices for the virtual machines 106-110 use generated and unique SAS addresses to create the one-to-one associations between the virtual ports 120-132 and the SRVPs 138-140 within each virtual expander 134, 136.

Figure 2:
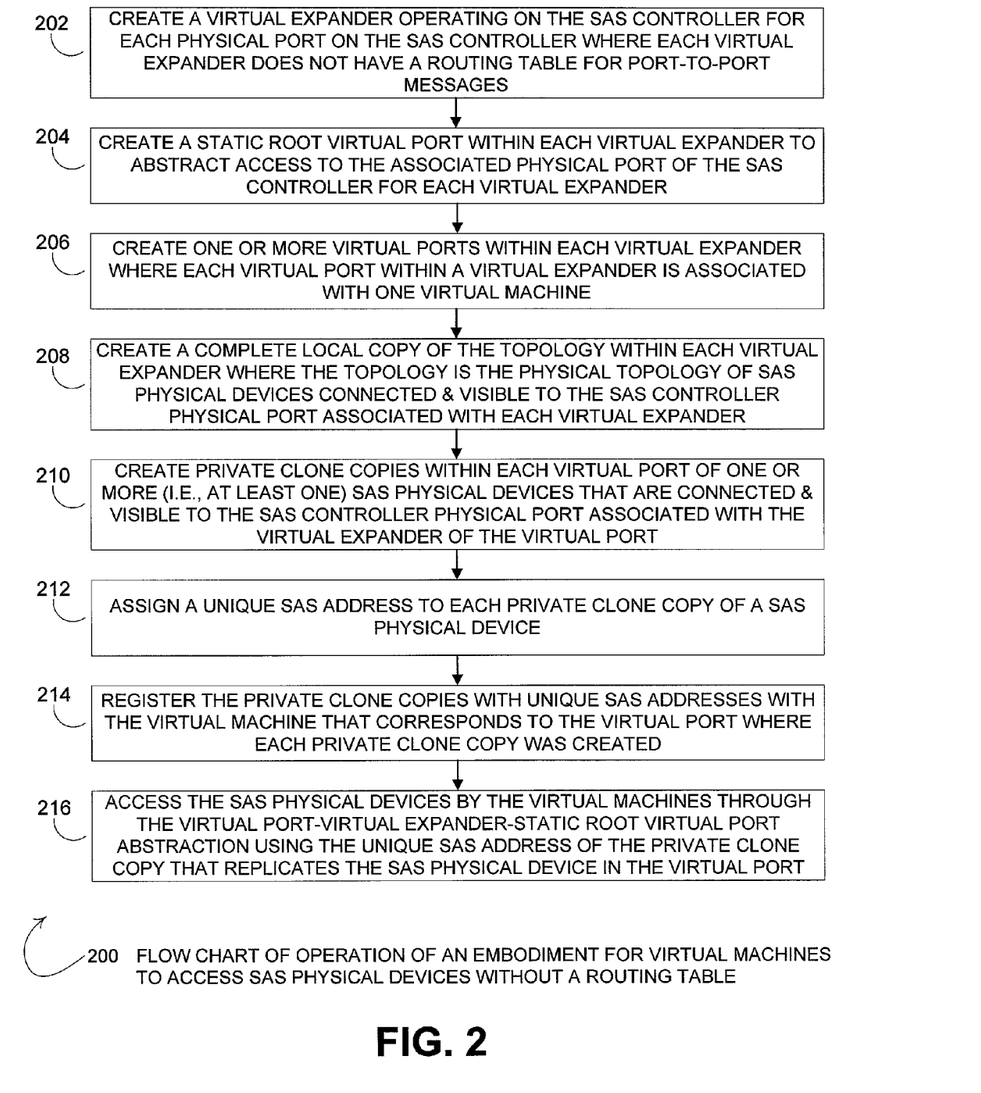
FIG. 2 is a flow chart of operation of an embodiment for virtual machines to access SAS physical devices without a routing table implemented on the SAS controller.

FIG. 2 is a flow chart 200 of operation of an embodiment for virtual machines to access SAS physical devices without a routing table implemented on the SAS controller. For the operation of the embodiment shown in FIG. 2, the embodiment has one or more virtual machines operating on a computer system in addition to the master/hypervisor of the virtualization that enables the use of virtual machines. Also, the computer system is connected to one or more SAS physical devices via one or more physical ports of a SAS controller of the computer system. At step 202, a virtual expander operating on the SAS controller is created for each physical port on the SAS controller. There is not a routing table for port-to-port messages implemented for the virtual expanders. At step 204, a Static Root Virtual Port (SRVP) is created within each virtual expander to abstract access to the physical port of the SAS controller associated with each virtual expander. At step 206, one or more virtual ports are created within each virtual expander. Each of the virtual ports within one expander is associated with one virtual machine operating on the computer system (i.e., physical server). At step 208, a complete local copy of the physical topology of SAS physical devices connected and visible to the SAS controller through a physical port is created within the virtual expander associated with the physical port. At step 210, private clone copies are created within each virtual port of one or more (i.e., at least one) SAS physical devices that are connected and visible to the SAS controller physical port associated with the virtual expander of each virtual port. The private clone copies may be based on the complete local copy of the physical topology of SAS physical devices created within each virtual expander. At step 212, a unique SAS address is assigned to each private clone copy of a SAS physical device created within the virtual ports of the SAS controller. At step 214, each private clone copy with a unique SAS address is registered with the virtual machine associated with the virtual port where each private clone copy was created. At step 216, the one or more virtual machines access the SAS physical devices through the virtual port-virtual expander-static root virtual port abstraction using the unique SAS addresses of the private clone copies that replicate the SAS physical devices in the virtual ports associated with each virtual machine.

Figure 3:
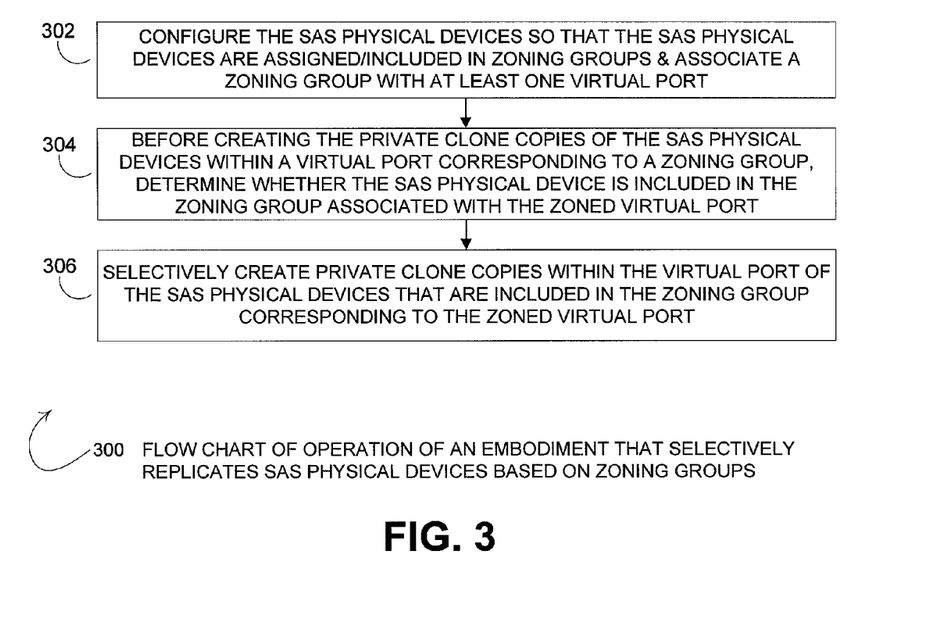
FIG. 3 is a flow chart of operation of an embodiment that selectively replicates/clones SAS physical devices based on zoning groups configured for the SAS physical device topology.

FIG. 3 is a flow chart 300 of operation of an embodiment that selectively replicates/clones SAS physical devices based on zoning groups configured for the SAS physical device topology. For the operation of the embodiment shown in FIG. 3, the topology of physical devices connected and visible to at least one physical port of the SAS controller includes a plurality of SAS physical devices with at least one SAS physical device being a SAS physical expander that supports zoning. At step 302, the plurality of SAS physical devices are configured for inclusion in a plurality of zoning groups and a zoning group is associated with at least one virtual port. Each zoning group includes at least a subset of the plurality of physical devices connected and visible to the physical port of the SAS controller. At step 304, before creating the private clone copies of the SAS physical devices within a virtual port corresponding to a zoning group, it is first determined whether the SAS physical device being replicated is included in the zoning group associated with the virtual port. At step 306, private clone copies of the SAS physical devices included in the zoning group associated with the virtual port are selectively created in the zoned virtual port such that SAS physical devices that are not included in the zoning group associated with the virtual port are not created in the zoned virtual port.

Figure 4:
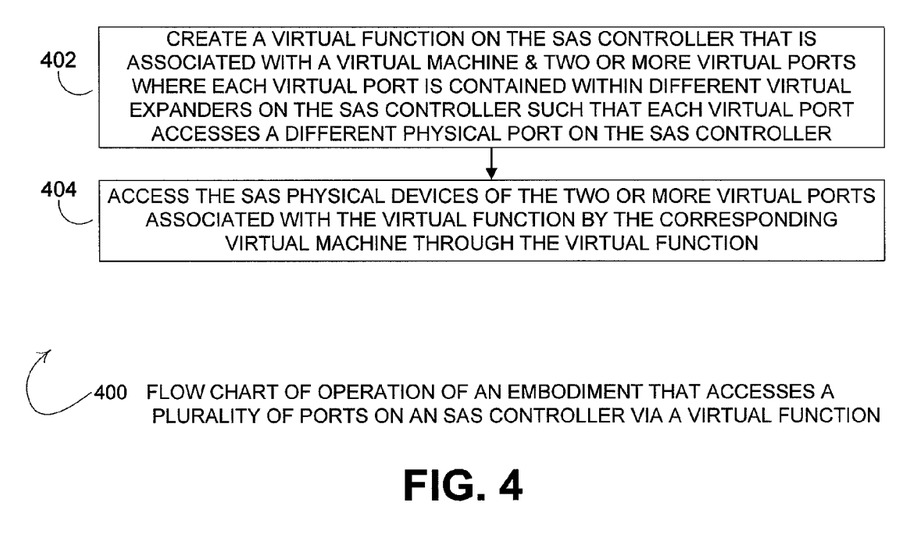
FIG. 4 is a flow chart of operation of an embodiment that accesses a plurality of ports of an SAS controller via a virtual function associated with a virtual machine operating on the physical server of the computer system.

FIG. 4 is a flow chart 400 of operation of an embodiment that accesses a plurality of ports of an SAS controller via a virtual function associated with a virtual machine operating on the physical server of the computer system. For the operation of the embodiment shown in FIG. 4, there is a plurality of physical ports on the SAS controller with a virtual expander associated with each physical port operating within the SAS controller. At step 402, a virtual function that operates on the SAS controller is created for each virtual machine operating on the physical server. Each virtual function is associated with one virtual machine and two or more virtual ports. Each of the virtual ports associated with one virtual function should be contained within different virtual expanders on the SAS controller such that each virtual port associated with one virtual function accesses a different physical port of the SAS controller. At step 404, each virtual machine accesses the SAS physical devices through the virtual function associated with the virtual machine such that the virtual machine accesses the SAS devices through the two or more virtual ports connected to the virtual function of the virtual machine.

Figure 5:
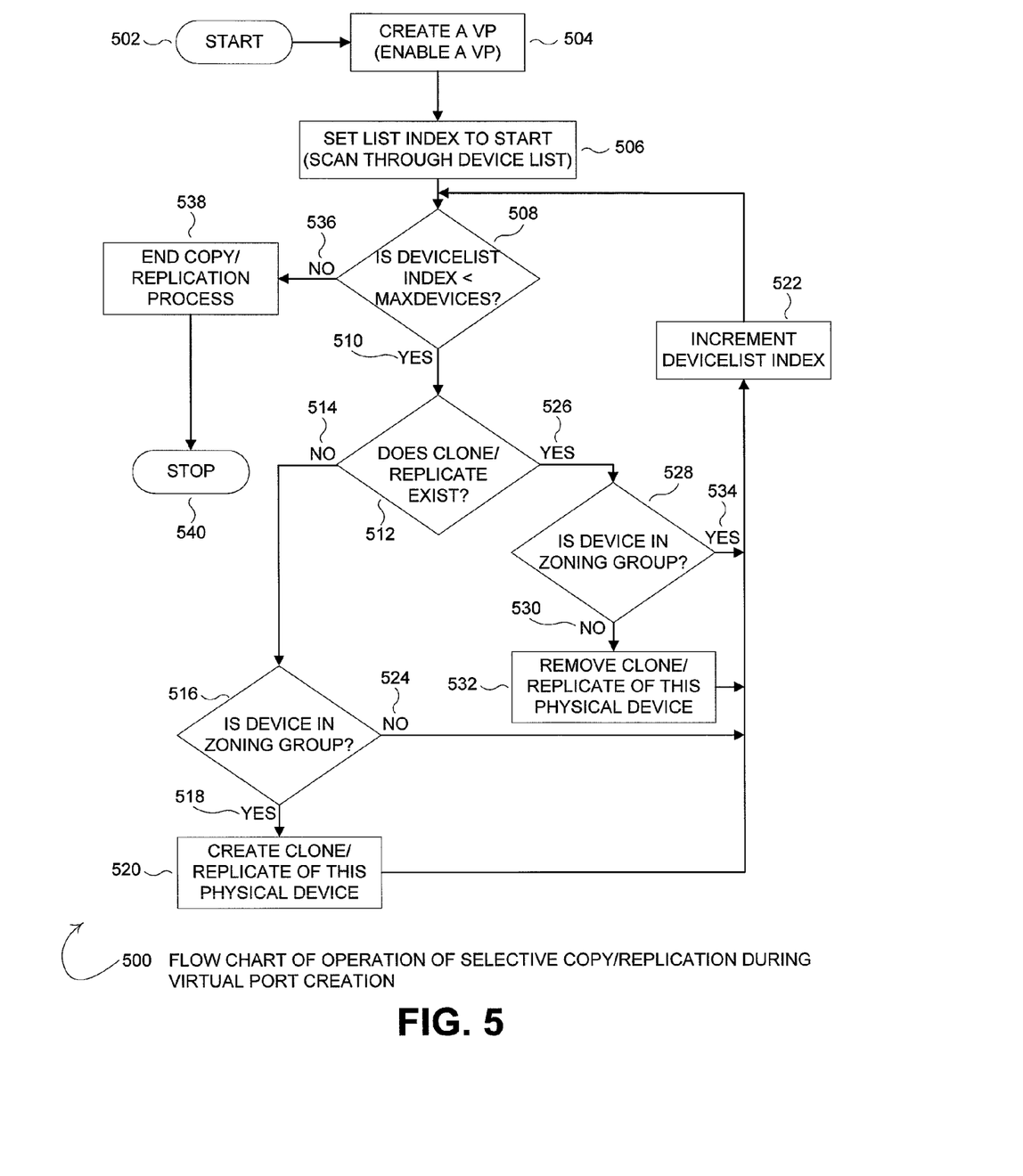
FIG. 5 is a flow chart of operation of selective copy/replication of SAS physical devices during virtual port creation of an embodiment.

FIG. 5 is a flow chart 500 of operation of selective copy/replication of SAS physical devices during virtual port creation of an embodiment. Operation starts at step 502. At step 504, a command to create, and enable, a virtual port is received by the SAS controller. For an embodiment, the command to create, and enable, a virtual port may be sent as a Message Passing Interface (MPI) message from the master/host/hypervisor to the SAS controller. To summarize, for a newly created virtual port, firmware on the SAS controller may scan through the SAS physical devices in the topology, figure out which SAS physical devices are in zone with the virtual port being created, and then replicate the SAS physical devices that are in the zone with the virtual port as private clone copies created within the newly created virtual port (see steps 506-540 of FIG. 5 and the disclosure with respect to steps 506-540 below). An embodiment of the SAS controller may then send a SAS topology change event back to the master/host/hypervisor and the master/host/hypervisor may acknowledge the SAS topology change event and register the replicated SAS devices with the corresponding virtual machine. A SAS physical device is in zone with respect to a virtual port if the SAS physical device and all of the SAS physical device's parent devices in the SAS topology are in zone with the virtual port. If a parent SAS physical device is not in zone with the virtual port, then the SAS physical device will not be replicated within the virtual port. If the SAS physical device and all the parent SAS physical devices for the SAS physical device are in zone with the virtual port, then the SAS physical device and all of the parent SAS physical devices of the SAS physical device will be replicated within the virtual port.

After receiving the command to create, and enable, a new virtual port at step 504, the process of SAS physical device replication may begin. At step 506, the list index is set to start so that the process may scan through the entire device list. At step 508, it is determined if the DeviceList index is less than the max number of devices. If the device list is less than the max number of devices 510, then the process moves to step 512. At step 512, it is determined if a clone or replicate of the current SAS physical device (i.e., the SAS physical device corresponding to the current DeviceList index) exists within the virtual port. If a clone/replicate of the current SAS physical device does not exist 514, then the process moves to step 516. At step 516, it is determined if the current SAS physical device is in the zoning group associated with the newly created virtual port (i.e., is zoned in with respect to the virtual port). If the current SAS device is in the same zoning group as the newly created virtual port 518, then the process moves to step 520. At step 520, a clone/replicate of the current SAS physical device is created within the newly created virtual port and the process moves to step 522. At step 522, the DeviceList index is incremented (i.e., moved to the next SAS physical device in the device list) and the process returns to step 508 to determine if the DeviceList index is less than the maximum number of devices. If it was determined at step 516 that the current SAS physical device was not in the same zoning group as the newly created virtual port 524, the process would skip the cloning/replication of step 520 and move directly to step 522 to increment the DeviceList index and return to step 508. If it was determined at step 512 that a clone/replicate of the SAS physical device did exist in the newly created virtual port 526, the process would move to step 528. At step 528, it is determined if the current SAS physical device is in the zoning group associated with the newly created virtual port (i.e., is zoned in with respect to the virtual port). If the current SAS device is not in the same zoning group as the newly created virtual port 530, then the process moves to step 532. At step 532, the clone/replicate of the current SAS physical device in the newly created virtual port is removed from the virtual port and the process moves to step 522. If it is determined in step 528 that the SAS physical device is in the same zoning group as the newly created virtual port 534, nothing is done because the clone/replicate already exists, and the process moves to step 522. At step 522, the DeviceList index is incremented to the next SAS physical device in the device list and the process returns to step 508. If it is determined at step 508 that the DeviceList index is not less than the maximum number of devices 536, then the process moves to step 538. At step 538, the copy/replication process is ended, any necessary SAS change messages are sent to the master/host/hypervisor, and the copy/replication process for the virtual port is stopped 540.

Figure 6:
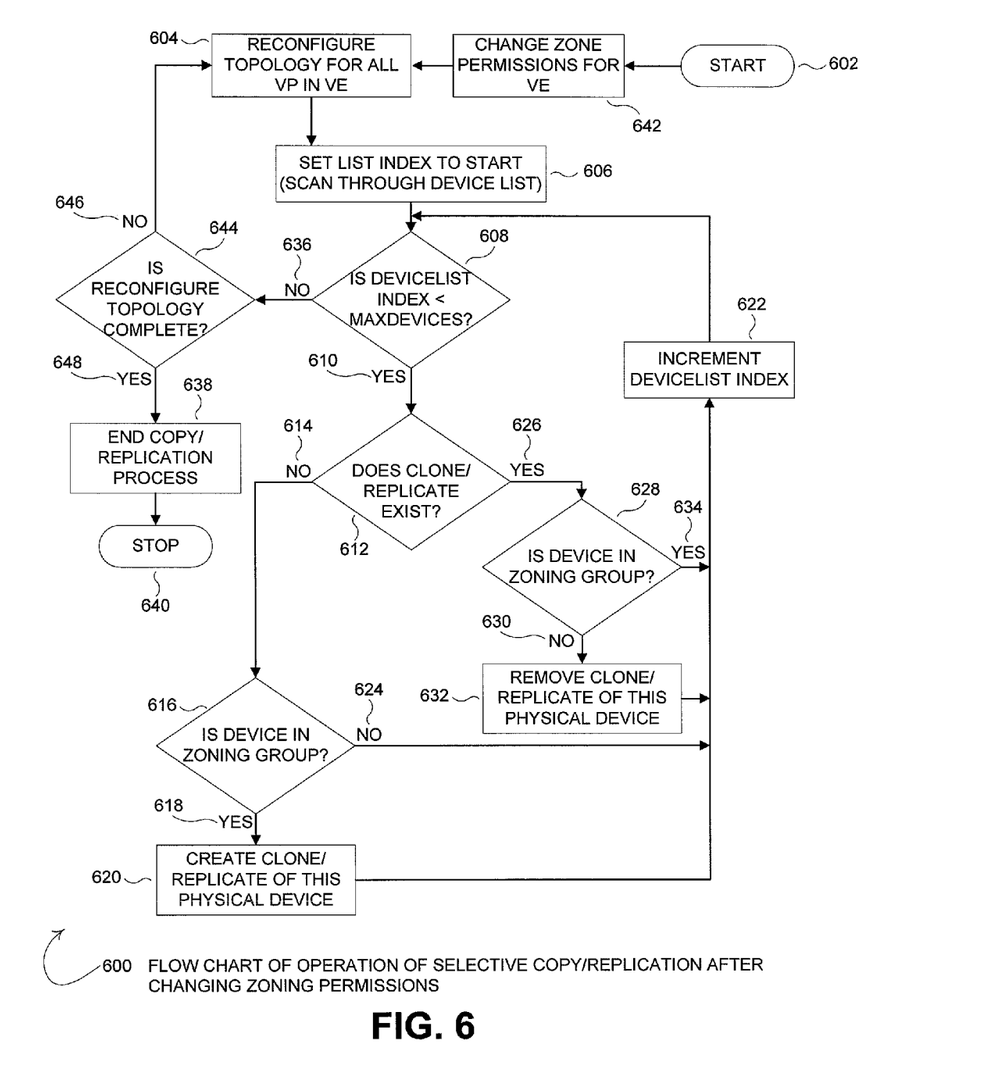
FIG. 6 is a flow chart of operation of selective copy/replication of SAS physical devices after changing zoning permissions of an embodiment.

FIG. 6 is a flow chart 600 of operation of selective copy/replication of SAS physical devices after changing zoning permissions of an embodiment. Operation starts at step 602. At step 642, zone permissions are changed for a virtual expander. Zoning changes may be changed for an embodiment by a zone manager application. A zone manager application may make changes to which SAS physical devices are connected within a zoning group. The zone manager may also change the zone permission table to modify access permission for SAS devices already included in a zoning group. Thus, the zone manger may make changes to the zoning group topology that zones out a physical device with respect to a virtual port which was previously zoned in with respect to the virtual port. From the perspective of the virtual machine connected to the virtual port, zoning out of a SAS physical device is equivalent to removing the SAS physical device and the firmware needs to remove any clones/replicates from the virtual port of SAS physical devices that have been zoned out with respect to the virtual port. The zone manager may also make a change where a SAS physical device is zoned in with respect to a virtual port where the SAS physical device was previously zoned out with respect to the virtual port. From the perspective of the virtual machine connected to the virtual port, zoning in of a SAS physical device is equivalent to adding the SAS physical device and the firmware needs to add clones/replicates to the virtual ports of SAS physical devices that have been zoned in with respect to the virtual ports.

After receiving notice that the zoning permissions for a virtual expander have changed at step 642, the process of updating SAS physical device replication may begin. At step 604, the firmware is commanded to reconfigure the topology for all virtual ports within the virtual expander. At step 606, the list index is set to start so that the process may scan through the entire device list for the current virtual port of the virtual expander. At step 608, it is determined if the DeviceList index is less than the max number of devices. If the device list is less than the max number of devices 610, then the process moves to step 612. At step 612, it is determined if a clone or replicate of the current SAS physical device (i.e., the SAS physical device corresponding to the current DeviceList index) exists within the current virtual port. If a clone/replicate of the current SAS physical device does not exist 614, then the process moves to step 616. At step 616, it is determined if the current SAS physical device is in the zoning group associated with the current virtual port (i.e., is zoned in with respect to the virtual port). If the current SAS device is in the same zoning group as the current virtual port 618, then the process moves to step 620. At step 620, a clone/replicate of the current SAS physical device is created within the current virtual port and the process moves to step 622. At step 622, the DeviceList index is incremented (i.e., moved to the next SAS physical device in the device list) and the process returns to step 608 to determine if the DeviceList index is less than the maximum number of devices. If it was determined at step 616 that the current SAS physical device was not in the same zoning group as the current virtual port 624, the process would skip the cloning/replication of step 620 and move directly to step 622 to increment the DeviceList index and return to step 608. If it was determined at step 612 that a clone/replicate of the SAS physical device did exist in the current virtual port 626, the process would move to step 628. At step 628, it is determined if the current SAS physical device is in the zoning group associated with the current virtual port (i.e., is zoned in with respect to the virtual port). If the current SAS device is not in the same zoning group as the current virtual port 630, then the process moves to step 632. At step 632, the clone/replicate of the current SAS physical device in the current virtual port is removed from the virtual port and the process moves to step 622. If it is determined in step 628 that the SAS physical device is in the same zoning group as the current virtual port 634, nothing is done because the clone/replicate already exists, and the process moves to step 622. At step 622, the DeviceList index is incremented to the next SAS physical device in the device list and the process returns to step 608. If it is determined at step 608 that the DeviceList index is not less than the maximum number of devices 636, then the process moves to step 644. At step 644 it is determined if the reconfiguration of the virtual expander topology is complete. If it is determined at step 644 that the reconfiguration of the virtual expander topology is not complete 646, the process returns to step 604 and the selective replication process is completed in steps 606-636 for another virtual port within the virtual expander. If it is determined at step 644 that the reconfiguration of the virtual expander topology is complete, then the process moves to step 638. At step 638, the copy/replication process is ended, any necessary SAS change messages are sent to the master/host/hypervisor, and the copy/replication process for the virtual expander is stopped 640.

Figure 7:
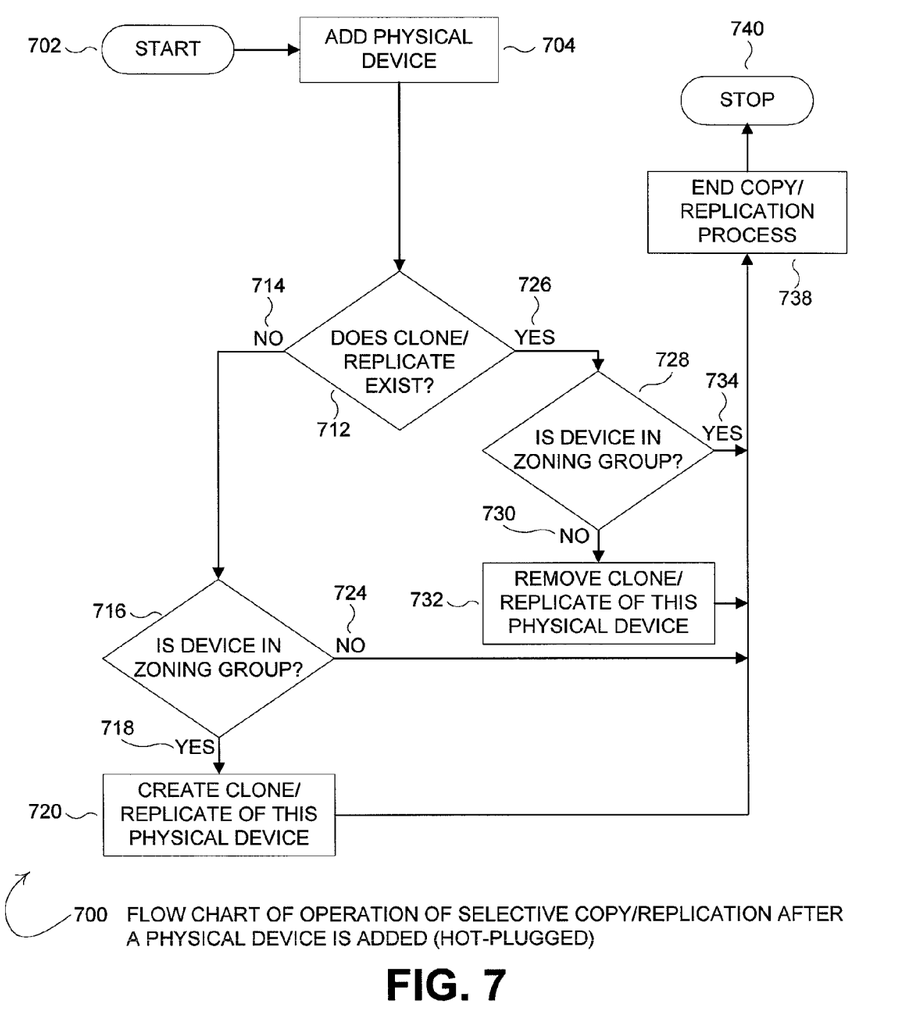
FIG. 7 is a flow chart of operation of selective copy/replication of SAS physical devices after a SAS physical device is added (i.e., hot-plugged) for an embodiment.

FIG. 7 is a flow chart 700 of operation of selective copy/replication of SAS physical devices after a SAS physical device is added (i.e., hot-plugged) for an embodiment. Operation starts at step 702. At step 704, a SAS physical device is physically added to the system (i.e., hot-plugged into the physical topology). When a device is hot-plugged (i.e., added) into the physical topology, the firmware in the SAS controller will need to clone/replicate the new SAS physical device for all virtual ports which have sufficient zone permissions to communicate with the new SAS physical device. The firmware for an embodiment may then send a SAS change topology event to the master/host/hypervisor. The master/host/hypervisor and the virtual machines that have visibility into the end device through an associated virtual port may register the newly created clone/replicate devices.

After being notified that a SAS physical device has been added at step 704, the process of SAS physical device replication may begin. At step 712, it is determined if a clone or replicate of the added SAS physical device exists within a virtual port. If a clone/replicate of the current SAS physical device does not exist 714, then the process moves to step 716. At step 716, it is determined if the added SAS physical device is in the zoning group associated with the virtual port (i.e., is zoned in with respect to the virtual port). If the current SAS device is in the same zoning group as the virtual port 718, then the process moves to step 720. At step 720, a clone/replicate of the added SAS physical device is created within the virtual port and the process moves to step 738. At step 738, the copy/replication process is ended, any necessary SAS change messages are sent to the master/host/hypervisor, and the copy/replication process for the virtual port is stopped 740. If it was determined at step 716 that the added SAS physical device was not in the same zoning group as the virtual port 724, the process would skip the cloning/replication of step 720 and move directly to step 738 that ends the copy/replication process. If it was determined at step 712 that a clone/replicate of the added SAS physical device did exist in the virtual port 726, the process would move to step 728. At step 728, it is determined if the added SAS physical device is in the zoning group associated with the virtual port (i.e., is zoned in with respect to the virtual port). If the added SAS device is not in the same zoning group as the virtual port 730, then the process moves to step 732. At step 732, the clone/replicate of the added SAS physical device in the virtual port is removed from the virtual port and the process moves to step 738 that ends the copy/replication process. If it is determined in step 728 that the added SAS physical device is in the same zoning group as the virtual port 734, nothing is done because the clone/replicate already exists, and the process moves to step 738. At step 738, the copy/replication process is ended, any necessary SAS change messages are sent to the master/host/hypervisor, and the copy/replication process for the virtual port is stopped 740. The process steps from 712-740 may be repeated for each virtual port in the virtual expander to ensure that each virtual port properly updates for the added SAS physical device.

Figure 8:
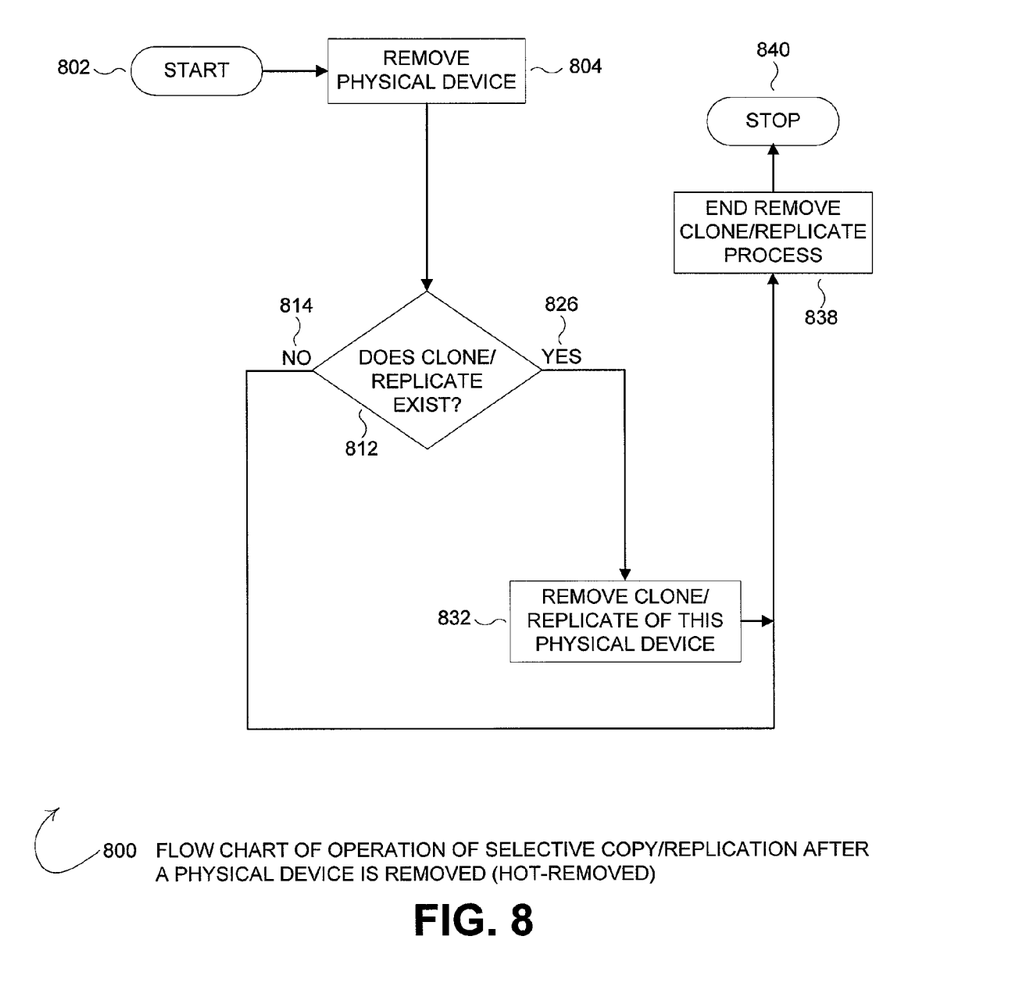
FIG. 8 is a flow chart of operation of selective copy/replication of SAS physical devices after a SAS physical device is removed (i.e., hot-removed) for an embodiment.

FIG. 8 is a flow chart 800 of operation of selective copy/replication of SAS physical devices after a SAS physical device is removed (i.e., hot-removed) for an embodiment. Operation starts at step 802. At step 804, a SAS physical device is physically removed from the system (i.e., hot-removed from the physical topology). When a device is hot-removed (i.e., removed) from the physical topology, the firmware in the SAS controller will need to remove any clones/replicates from the virtual ports. The master/host/hypervisor and the virtual machines may then send task management commands/messages down to the remaining SAS physical devices to properly clean up for and unregister the removed SAS physical device.

After being notified that a SAS physical device has been removed at step 804, the process of removing clones/replicates may begin. At step 812, it is determined if a clone or replicate of the removed SAS physical device exists within a virtual port. If a clone/replicate of the current SAS physical device does not exist 814, then nothing needs to be done and the process may move to step 838 to end the remove clone/replicate process. If it was determined at step 812 that a clone/replicate of the removed SAS physical device did exist in the virtual port 826, the process would move to step 832. At step 832, the clone/replicate of the removed SAS physical device in the virtual port is removed from the virtual port and the process moves to step 838 that ends the clone/replicate removal process. At step 838, the copy/replication process for a removed physical device is ended, any necessary SAS change messages are sent to the master/host/hypervisor, and the remove physical device copy/replication process for the virtual port is stopped 840. The process steps from 812-840 may be repeated for each virtual port in the virtual expander to ensure that each virtual port properly updates for the removed SAS physical device.

Various embodiments may provide the control and management functions detailed herein via an application operating on a computer system, or other electronic devices such as a SAS controller. Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for at least one virtual machine operating on a computer system, in addition to a master/hypervisor application operating on said computer system, to access at least one Serial Attached SCSI (Small Computer System Interface) (SAS) physical device connected to said computer system via at least one physical port of a SAS controller of said computer system without using a routing table on said SAS controller comprising:

creating a virtual expander operating on said SAS controller for said at least one physical port of said SAS controller, said virtual expander not having a routing table for port-to-port routing of messages;

creating a static root virtual port operating within said virtual expander on said SAS controller to abstract access to said at least one SAS physical device connected via said at least one physical port of said SAS controller;

creating a virtual port operating within said virtual expander on said SAS controller that operates in coordination with said at least one virtual machine;

creating a complete local topology copy within said virtual expander operating on said SAS controller that replicates a physical topology of physical devices connected and visible to said at least one physical port of said SAS controller, said complete local topology copy including said at least one SAS physical device;

creating a private clone copy of said at least one SAS physical device within said virtual port operating within said virtual expander based on said complete local topology copy within said virtual expander such that said at least one SAS physical device is replicated within said virtual port;

assigning a unique SAS address to said private clone copy of said at least one SAS physical device;

registering said private clone copy assigned said unique SAS address with said at least one virtual machine corresponding to said virtual port such that a one-to-one association is established between said virtual port and said static root virtual port within said virtual expander operating on said SAS controller; and accessing said at least one SAS physical device by said at least one virtual machine through said private clone copy of said at least one SAS physical device replicated on said corresponding virtual port using said unique SAS address.

2. The method of claim 1 wherein said creation of said virtual port is initiated by a message from said master/hypervisor application to create and enable said virtual port.

3. The method of claim 1 wherein at least one additional private clone copy of at least one additional SAS physical device is created within said virtual port when said at least one additional SAS physical device is physically added to said topology of physical devices connected and visible to said at least one physical port of said SAS controller.

4. The method of claim 1 wherein at least one subtracted private clone copy of at least one subtracted SAS physical device is removed from within said virtual port when said at least one subtracted SAS physical device is physically removed from said topology of physical devices connected and visible to said at least one physical port of said SAS controller.

5. The method of claim 1:
wherein said physical topology connected and visible to said at least one physical port of said SAS controller includes at least one physical expander and said at least one physical expander supports zoning;
wherein said physical topology includes a plurality of SAS physical devices;
wherein said plurality of SAS physical devices are configured for inclusion in a plurality of zoning groups such that each zoning group of said plurality of zoning groups includes at least a subset of said plurality of SAS physical devices;
wherein said virtual port corresponding to said at least one virtual machine is associated with a zoning group and said zoning group is one of said plurality of zoning groups; and
wherein said step of creating said private clone copy of said at least one physical device within said virtual port further comprises first determining whether said at least one SAS physical device is included in said zoning group and selectively creating said private clone copy of said at least one physical device when said at least one SAS physical device is included in said zoning group such that when said at least one SAS physical device is not included in said zoning group said private clone copy of said at least one SAS physical device is not created within said virtual port.

6. The method of claim 5 wherein at least one additional private clone copy of at least one additional SAS physical device is created within said virtual port when said at least one SAS physical device is configured to be added to said zoning group.

7. The method of claim 5 wherein at least one subtracted private clone copy of at least one subtracted SAS physical device is removed from said virtual port when said at least one subtracted SAS physical device is configured to be no longer included in said zoning group.

8. The method of claim 1 wherein there are a plurality of physical ports on said SAS controller and each physical port of said plurality of physical ports has a separate associated virtual expander abstracting access to separate physical topologies connected and visible to each physical port of said plurality of physical ports, and further comprising:

creating a virtual function within said SAS controller that is associated with said at least one virtual machine, said virtual function further being associated with a first virtual port in a first virtual expander and at least one additional virtual port in an additional virtual expander, said virtual function being associated with at most one virtual port in each of said separate associated virtual expanders such that said at least one virtual machine corresponding with said virtual function has access to SAS physical devices connected to said SAS controller through a first physical port of said SAS controller and at least one additional physical port of said SAS controller; and accessing said SAS physical devices connected to said SAS controller through said first physical port of said SAS controller and said at least one additional physical port of said SAS controller through said virtual function and said associated virtual ports.

9. The method of claim 1 wherein said virtual expander is a self configuring virtual expander.

10. The method of claim 1 wherein said at least one SAS physical device is one of a group comprising: a Redundant Array of Independent Disks (RAID), a hard disk drive, a solid state drive, an optical drive, a tape drive, a computer readable storage device, and a SAS expander.

11. A Serial Attached SCSI (Small Computer System Interface) (SAS) controller incorporated into a computer system that interacts with at least one virtual machine operating on said computer system, in addition to a master/hypervisor application operating on said computer system, that accesses at least one SAS physical device connected to said computer system via at least one physical port of said SAS controller of said computer system without using a routing table on said SAS controller comprising:

a virtual expander creation subsystem that creates a virtual expander that operates on said SAS controller and is associated with said at least one physical port of said SAS controller, said virtual expander not having a routing table for port-to-port routing of messages;

a static root virtual port creation subsystem that creates a static root virtual port that operates within said virtual expander on said SAS controller and that abstracts access to said at least one SAS physical device connected via said at least one physical port of said SAS controller;

a virtual port creation subsystem that creates a virtual port that operates within said virtual expander on said SAS controller and that operates in coordination with said at least one virtual machine;

a topology replication subsystem that creates a complete local topology copy within said virtual expander operating on said SAS controller to replicate a physical topology of physical devices connected and visible to said at least one physical port of said SAS controller, said complete local topology copy including said at least one SAS physical device;

a private clone copy creation subsystem that creates a private clone copy of said at least one SAS physical device within said virtual port operating within said virtual expander based on said complete local topology copy within said virtual expander such that said at least one SAS physical device is replicated within said virtual port;

an SAS address assignment subsystem that assigns a unique SAS address to said private clone copy of said at least one SAS physical device;

a registration subsystem that registers said private clone copy assigned said unique SAS address with said at least one virtual machine corresponding to said virtual port such that a one-to-one association is established between said virtual port and said static root virtual port within said virtual expander operating on said SAS controller, and such that said at least one SAS physical device is accessed by said at least one virtual machine through said private clone copy of said at least one SAS physical device replicated on said corresponding virtual port using said unique SAS address.

12. The SAS controller of claim 11 wherein said creation of said virtual port is initiated by a message from said master/hypervisor application to said SAS controller to create and enable said virtual port.

13. The SAS controller of claim 11 wherein said private clone copy creation subsystem creates at least one additional private clone copy of at least one additional SAS physical device within said virtual port when said at least one additional SAS physical device is physically added to said topology of physical devices connected and visible to said at least one physical port of said SAS controller.

14. The SAS controller of claim 11 further comprising a private clone copy removal subsystem removes at least one subtracted private clone copy of at least one subtracted SAS physical device from within said virtual port when said at least one subtracted SAS physical device is physically removed from said topology of physical devices connected and visible to said at least one physical port of said SAS controller.

15. The SAS controller of claim 11:

wherein said physical topology connected and visible to said at least one physical port of said SAS controller includes at least one physical expander and said at least one physical expander supports zoning;

wherein said physical topology includes a plurality of SAS physical devices;

wherein said plurality of SAS physical devices are configured for inclusion in a plurality of zoning groups such that each zoning group of said plurality of zoning groups includes at least a subset of said plurality of SAS physical devices;

wherein said virtual port corresponding to said at least one virtual machine is associated with a zoning group and said zoning group is one of said plurality of zoning groups; and wherein said private clone copy creation subsystem first determines whether said at least one SAS physical device is included in said zoning group and selectively creates said private clone copy of said at least one physical device when said at least one SAS physical device is included in said zoning group such that when said at least one SAS physical device is not included in said zoning group said private clone copy of said at least one SAS physical device is not created within said virtual port.

16. The SAS controller of claim 15 wherein private clone copy creation subsystem creates at least one additional private clone copy of at least one additional SAS physical within said virtual port when said at least one SAS physical device is configured to be added to said zoning group.

17. The SAS controller of claim 15 further comprising a private clone copy removal subsystem removes at least one subtracted private clone copy of at least one subtracted SAS physical device from said virtual port when said at least one subtracted SAS physical device is configured to be no longer included in said zoning group.

18. The SAS controller of claim 11 wherein there are a plurality of physical ports on said SAS controller and said virtual expander creation subsystem creates a separate virtual expander associated with each physical port of said plurality of physical ports that abstracts access to separate physical topologies connected and visible to each physical port of said plurality of physical ports, and farther comprising:

a virtual function creation subsystem that creates a virtual function within said SAS controller that is associated with said at least one virtual machine, said virtual function further being associated with a first virtual port in a first virtual expander and at least one additional virtual port in an additional virtual expander, said virtual function being associated with at most one virtual port in each of said separate associated virtual expanders such that said at least one virtual machine corresponding with said virtual function has access to SAS physical devices connected to said SAS controller through a first physical port of said SAS controller and at least one additional physical port of said SAS controller, and such that said SAS physical devices connected to said SAS controller through said first physical port of said SAS controller and said at least one additional physical port of said SAS controller are accessed through said virtual function and said associated virtual ports.

19. A Serial Attached SCSI (Small Computer System Interface) (SAS) controller incorporated into a computer system that interacts with at least one virtual machine operating on said computer system, in addition to a master/hypervisor application operating on said computer system, that accesses at least one SAS physical device connected to said computer system via at least one physical port of said SAS controller of said computer system without using a routing table on said SAS controller comprising:

means for creating a virtual expander operating on said SAS controller for said at least one physical port of said SAS controller, said virtual expander not having a routing table for port-to-port routing of messages;

means for creating a static root virtual port operating within said virtual expander on said SAS controller to abstract access to said at least one SAS physical device connected via said at least one physical port of said SAS controller;

means for creating a virtual port operating within said virtual expander on said SAS controller that operates in coordination with said at least one virtual machine;

means for creating a complete local topology copy within said virtual expander operating on said SAS controller that replicates a physical topology of physical devices connected and visible to said at least one physical port of said SAS controller, said complete local topology copy including said at least one SAS physical device;

means for creating a private clone copy of said at least one SAS physical device within said virtual port operating within said virtual expander based on said complete local topology copy within said virtual expander such that said at least one SAS physical device is replicated within said virtual port;

means for assigning a unique SAS address to said private clone copy of said at least one SAS physical device;

means for registering said private clone copy assigned said unique SAS address with said at least one virtual machine corresponding to said virtual port such that a one-to-one association is established between said virtual port and said static root virtual port within said virtual expander operating on said SAS controller; and means for accessing said at least one SAS physical device by said at least one virtual machine through said private clone copy of said at least one SAS physical device replicated on said corresponding virtual port using said unique SAS address.

20. The SAS controller of claim 19:

wherein said physical topology connected and visible to said at least one physical port of said SAS controller includes at least one physical expander and said at least one physical expander supports zoning;

wherein said physical topology includes a plurality of SAS physical devices;

wherein said plurality of SAS physical devices are configured for inclusion in a plurality of zoning groups such that each zoning group of said plurality of zoning groups includes at least a subset of said plurality of SAS physical devices;

wherein said virtual port corresponding to said at least one virtual machine is associated with a zoning group and said zoning group is one of said plurality of zoning groups; and wherein said means for creating said private clone copy of said at least one physical device within said virtual port further comprises means for first determining whether said at least one SAS physical device is included in said zoning group and selectively creating said private clone copy of said at least one physical device when said at least one SAS physical device is included in said zoning group such that when said at least one SAS physical device is not included in said zoning group said private clone copy of said at least one SAS physical device is not created within said virtual port.

* * * * *